S. M. Wilson.
Vegetable Grater.
N° 98,832. Patented Jan. 11, 1870.
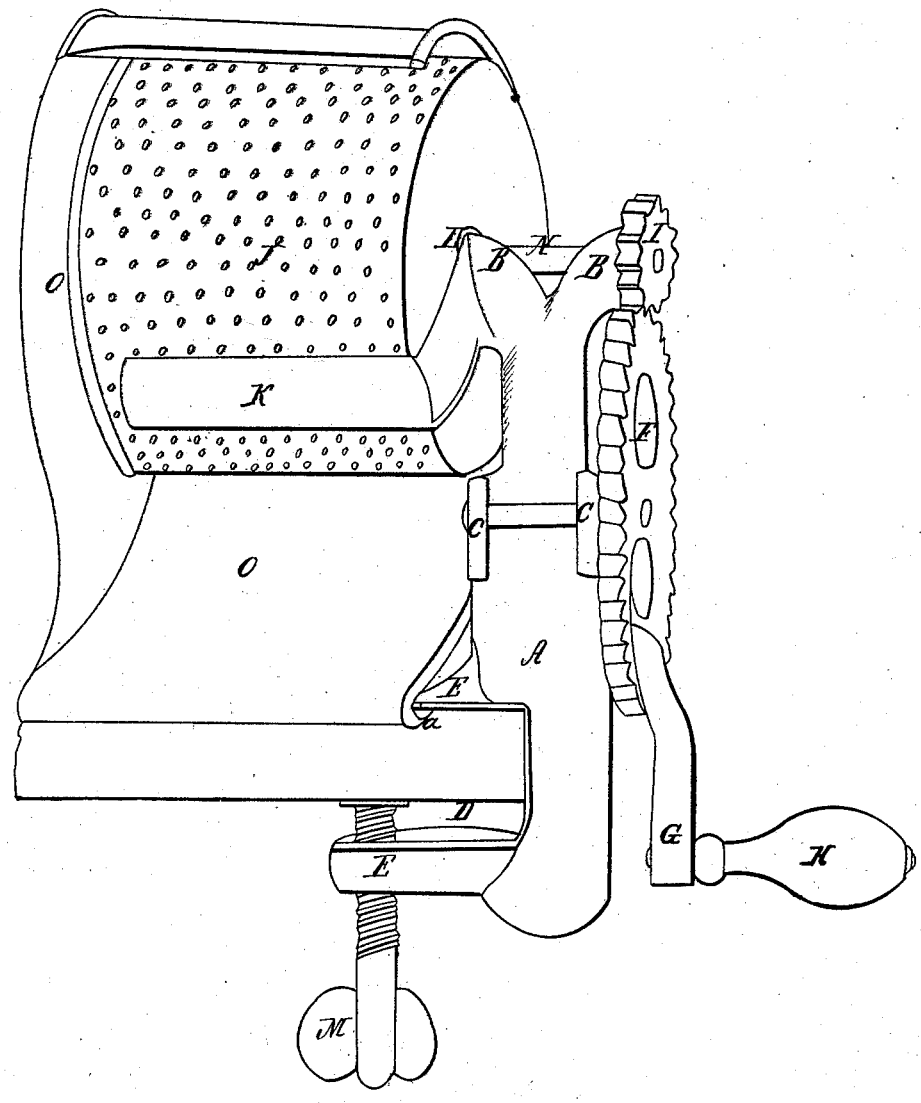
Witnesses:
A. F. Selleck
George Hanna
Inventor,
Samuel M. Wilson

United States Patent Office.

SAMUEL M. WILSON, OF NEW YORK, N. Y.

Letters Patent No. 98,832, dated January 11, 1870; antedated December 24, 1869.

IMPROVEMENT IN VEGETABLE-GRATER.

The Schedule referred to in these Letters Patent and making part of the same.

*To all whom it may concern:*

Be it known that I, SAMUEL M. WILSON, of the city, county, and State of New York, have invented a new and useful Improvement in Rotary Graters; and I do hereby declare the following to be a full, clear, and exact description thereof, sufficient to enable those skilled in the art to which my invention appertains, to fully understand, construct, and use the same, reference being had to the accompanying drawing, forming a part of this specification, and in which my invention is represented by a perspective view.

My invention consists in the construction, arrangement, and combination of parts, as hereinafter described.

In the drawing—

A represents an upright, which may be made of cast-iron, and which is provided with the lateral extensions E, through the lower of which a set-screw, M, is fitted, to clamp the device to the edge of a table, as at D.

At the upper end of the standard A, are formed arms, B B, one of which is extended, to constitute a rest, K.

J is the grating-cylinder, made hollow, of sheet-metal, open at one end, and keyed to a shaft, N, journaled in bearings in the arms B B.

The periphery of this cylinder is perforated with small round holes, having an upward inclination, so as to form an overhanging cutting-lip, uneven and jagged, while the lower sides of the holes are smooth, and free from jagged points, thus forming a very effective grater, having little liability to clog.

On the shaft N of the grating-cylinder, a pinion, I, is keyed, and its teeth engage with those of a large wheel, F, mounted on a short shaft, journaled in bearings in lugs c c, on the upright A.

The wheel F is provided with a crank-handle, G H.

To prevent the grated substance from being thrown off the periphery, or out at the end of the cylinder, by centrifugal force, and thereby wasted, I provide a hood, O, made of sheet-metal, bent into such form as to partially enclose the rotary cylinder, thus collecting the gratings, and conducting them to a receptacle provided for their reception.

The edge of the hood is bent back at *a*, so as to pass under the extension E, of the frame, and thereby hold the hood in position.

The operation will be readily understood. The horse-radish or other fruit, vegetable, or substance to be ground, is rested on the arm K, and pressed against the grating-surface by one hand, while with the other the crank is turned, and the cylinder thereby rotated.

Having thus described my invention,

What I claim as new, and desire to secure by Letters Patent, is—

The combination of the grating-cylinder J, with perforations, as described, hood O, frame A K E E, gearing F I, with crank G H, and clamping-screw M, all constructed and arranged to operate substantially as herein described and shown.

SAMUEL M. WILSON.

Witnesses:
A. F. SELLECK,
GEORGE HANNA.